United States Patent
Suzuki

(10) Patent No.: US 8,301,601 B2
(45) Date of Patent: Oct. 30, 2012

(54) LOG CONSOLIDATION DEVICE, LOG CONSOLIDATION METHOD, AND COMPUTER-READABLE MEDIUM

(75) Inventor: Tatsuya Suzuki, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/117,693

(22) Filed: May 27, 2011

(65) Prior Publication Data

US 2012/0117037 A1    May 10, 2012

(30) Foreign Application Priority Data

Nov. 9, 2010  (JP) ................. 2010-250609

(51) Int. Cl.
*G06F 17/30* (2006.01)
(52) U.S. Cl. ........................................ 707/648
(58) Field of Classification Search .................... 707/648
See application file for complete search history.

(56) References Cited

U.S. PATENT DOCUMENTS 8,032,489 B2 * 10/2011 Villella et al. ................. 707/622
2009/0125547 A1 * 5/2009 Kawakami et al. ........... 707/102

FOREIGN PATENT DOCUMENTS

| JP | 09-204327 A | 8/1997 |
| JP | 11-027312 A | 1/1999 |
| JP | 2000-069002 A | 3/2000 |
| JP | 2005-209115 A | 8/2005 |
| JP | 2005-227891 A | 8/2005 |

* cited by examiner

*Primary Examiner* — Cheryl Lewis
(74) *Attorney, Agent, or Firm* — Sughrue Mion, PLLC

(57) ABSTRACT

A log consolidation device includes: a selection unit that selects at least part of fields included in multiple logs stored in a storage unit and chronologically representing processes executed by one or multiple processing units, each log including information representing content of a process and a count value relating to the process, the information being divided into multiple fields; a deletion unit that deletes, from at least part of the multiple logs stored in the storage unit, items of information in the fields selected by the selection unit; and an integration unit that integrates into a single log two or more of the multiple logs having identical items of information in fields that were not deleted by the deletion unit by summing up the count values of the two or more of the multiple logs.

7 Claims, 7 Drawing Sheets

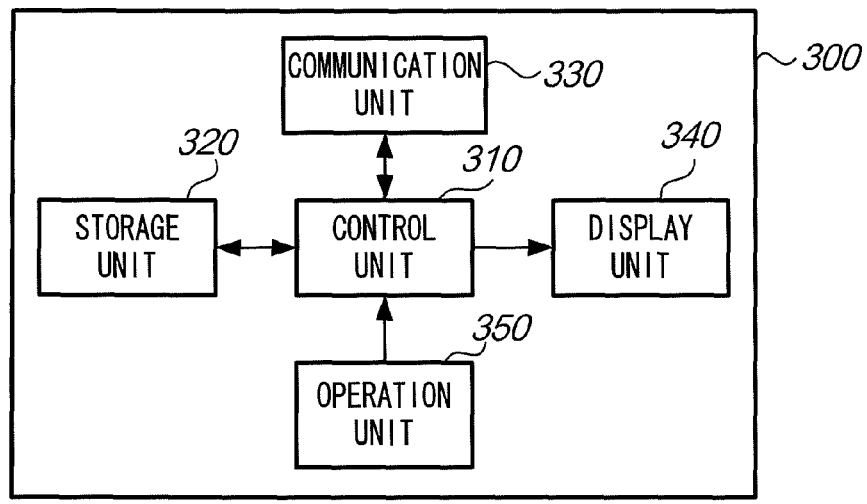
FIG. 5
| USER NAME | DEVICE NAME | MODEL NAME | SERVICE NAME | COLOR MODE | SHEET SIZE | NUMBER OF SIDES | NUMBER OF SHEETS |
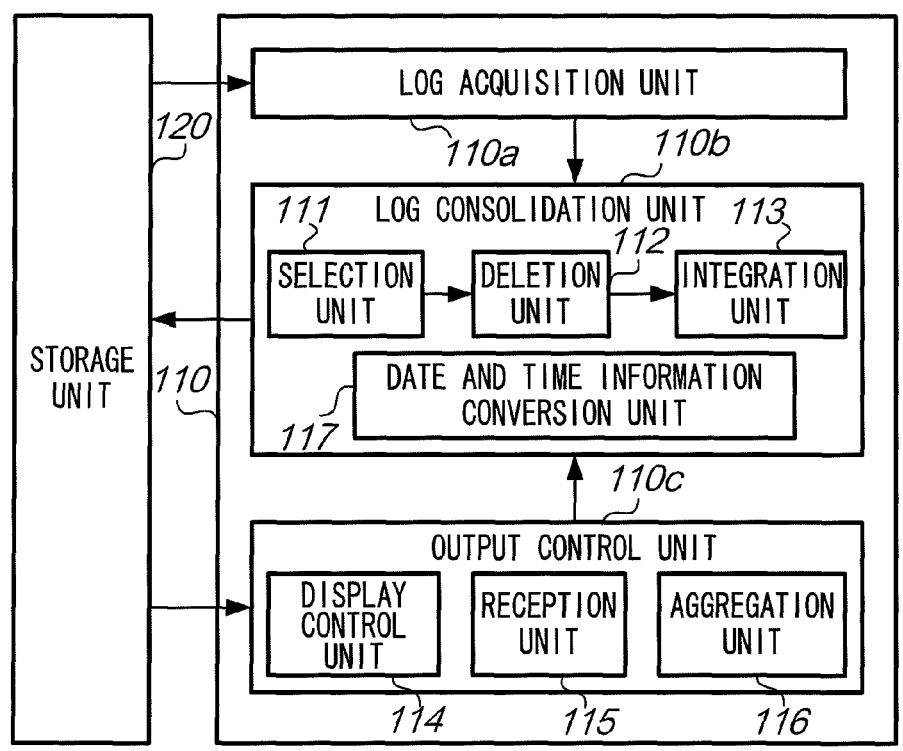

FIG. 8

| FIELD | NUMBER OF DESIGNATED TIMES | NUMBER OF RETAINED ITEMS |
|---|---|---|
| USER NAME | $x_1$ | $N_1 : f_1(x_1)$ |
| DEVICE NAME | $x_2$ | $N_2 : f_2(x_2)$ |
| MODEL NAME | $x_3$ | $N_3 : f_3(x_3)$ |
| SERVICE NAME | $x_4$ | $N_4 : f_4(x_4)$ |
| COLOR MODE | $x_5$ | $N_5 : f_5(x_5)$ |
| SHEET SIZE | $x_6$ | $N_6 : f_6(x_6)$ |
| NUMBER OF SIDES | – | $N_{max}$ |
| NUMBER OF SHEETS | – | $N_{max}$ |

FIG. 9A

| USER NAME | DEVICE NAME | MODEL NAME | SERVICE NAME | COLOR MODE | SHEET SIZE | NUMBER OF SIDES | NUMBER OF SHEETS |
|---|---|---|---|---|---|---|---|
| SUZUKI | A | M1 | PRINT | COLOR | A4 | 1 | 1 |
| SUZUKI | A | M1 | PRINT | MONOCHROMATIC | A3 | 2 | 2 |
| SUZUKI | A | M1 | PRINT | MONOCHROMATIC | A4 | 2 | 1 |
| SATO | A | M1 | PRINT | MONOCHROMATIC | A4 | 1 | 1 |

FIG. 9B

| USER NAME | DEVICE NAME | MODEL NAME | SERVICE NAME | SHEET SIZE | NUMBER OF SIDES | NUMBER OF SHEETS |
|---|---|---|---|---|---|---|
| SUZUKI | A | M1 | PRINT | A4 | 1 | 1 |
| SUZUKI | A | M1 | PRINT | A3 | 2 | 2 |
| SUZUKI | A | M1 | PRINT | A4 | 2 | 1 |
| SATO | A | M1 | PRINT | A4 | 1 | 1 |

FIG. 9C

| USER NAME | DEVICE NAME | MODEL NAME | SERVICE NAME | SHEET SIZE | NUMBER OF SIDES | NUMBER OF SHEETS |
|---|---|---|---|---|---|---|
| SUZUKI | A | M1 | PRINT | A4 | 3 | 2 |
| SUZUKI | A | M1 | PRINT | A3 | 2 | 2 |
| SATO | A | M1 | PRINT | A4 | 1 | 1 |

FIG. 10A

| USER NAME | DEVICE NAME | MODEL NAME | SERVICE NAME | NUMBER OF SIDES | NUMBER OF SHEETS |
|---|---|---|---|---|---|
| SUZUKI | A | M1 | プリント | 3 | 2 |
| SUZUKI | A | M1 | プリント | 2 | 2 |
| SATO | A | M1 | プリント | 1 | 1 |

FIG. 10B

| USER NAME | DEVICE NAME | MODEL NAME | SERVICE NAME | NUMBER OF SIDES | NUMBER OF SHEETS |
|---|---|---|---|---|---|
| SUZUKI | A | M1 | プリント | 5 | 4 |
| SATO | A | M1 | プリント | 1 | 1 |

FIG. 10C

| DEVICE NAME | MODEL NAME | SERVICE NAME | NUMBER OF SIDES | NUMBER OF SHEETS |
|---|---|---|---|---|
| A | M1 | プリント | 5 | 4 |
| A | M1 | プリント | 1 | 1 |

FIG. 10D

| DEVICE NAME | MODEL NAME | SERVICE NAME | NUMBER OF SIDES | NUMBER OF SHEETS |
|---|---|---|---|---|
| A | M1 | プリント | 6 | 5 |

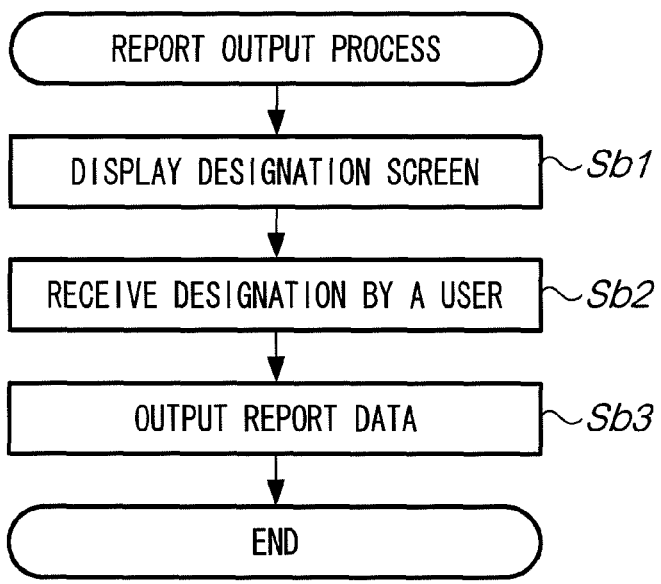

FIG. 11

LOG CONSOLIDATION DEVICE, LOG CONSOLIDATION METHOD, AND COMPUTER-READABLE MEDIUM

CROSS-REFERENCE TO RELATED APPLICATIONS

This application is based on and claims priority under 35 U.S.C. 119 from Japanese Patent Application No. 2010-250609, which was filed on Nov. 9, 2010.

BACKGROUND

1. Technical Field

The present invention relates to a log consolidation device, a log consolidation method, and a computer-readable medium.

2. Related Art

Content of a process executed by a processing unit may be recorded as a log, so that a user can refer to the log when necessary. Also, a storage area for storing logs has a limited capacity, and it is common that the stored logs are deleted in order, starting with the oldest one.

SUMMARY

In one aspect of the present invention, there is provided a log consolidation device including: a selection unit that selects at least part of fields included in multiple logs stored in a storage unit and chronologically representing processes executed by one or multiple processing units, each log including information representing content of a process and a count value relating to the process, the information being divided into multiple fields; a deletion unit that deletes, from at least part of the multiple logs stored in the storage unit, items of information in the fields selected by the selection unit; and an integration unit that integrates into a single log two or more of the multiple logs having identical items of information in fields that were not deleted by the deletion unit by summing up the count values of the two or more of the multiple logs.

BRIEF DESCRIPTION OF THE DRAWINGS

Exemplary embodiments of the present invention will now be described in detail with reference to the following figures, wherein:

FIG. 4 is a block diagram showing a hardware configuration of a user terminal;

FIG. 5 is a diagram showing an example of a data format of a log;

FIG. 8 is a diagram showing an example of data used in a log consolidation process;

FIGS. 9A to 9C are a set of diagrams showing an example of a change in a log file derived by a log consolidation process;

FIGS. 10A to 10D are a set of diagrams showing an example of a change in a log file derived by a log consolidation process;

FIG. 11 is a flowchart showing a report output process;

FIG. 13 is a functional block diagram showing a functional configuration of a log management terminal;

DETAILED DESCRIPTION

[First Exemplary Embodiment]

Figure 1:
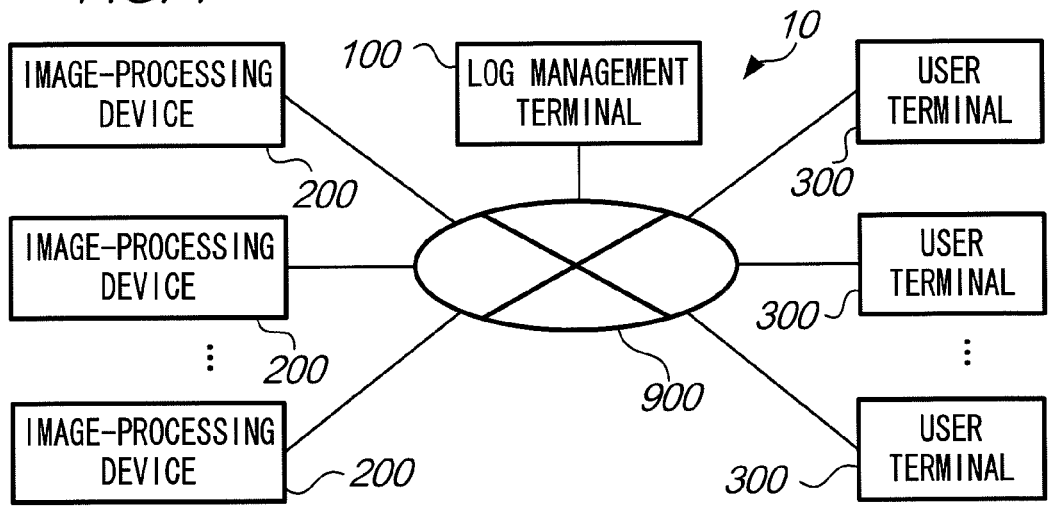
FIG. 1 is a block diagram showing an overall configuration of an information-processing system.

FIG. 1 is a block diagram showing an overall configuration of an information-processing system, which is an exemplary embodiment of the present invention. As shown in FIG. 1, information-processing system 10 of this exemplary embodiment includes log management terminal 100, multiple image-processing devices 200, and multiple user terminals 300, which are connected by network 900 so as to be able to communicate with one another. It is to be noted here that image-processing devices 200 include different models of device.

Information-processing system 10 may be a system configured for use by an organization having offices and the like. In such a case, network 900 may be a LAN (Local Area Network), for example. However, network 900 may be a so-called lease line, the Internet, or the like. Also, communication conducted via network 900 may be wired communication or wireless communication.

Each image-processing device 200 may be a copying machine or a printer (image-forming device), a scanner (image-reading device), a facsimile device, or a device having functions of these devices all together, and executes a process relating to an image. For example, in a case where image-processing device 200 is an image-forming device, image-processing device 200 forms an image on a medium to be used (in this exemplary embodiment, a sheet of paper) according to an instruction input by a user. In a case where image-processing device 200 is a facsimile device, image-processing device 200 sends or receives an image according to an instruction input by a user. When image-processing device 200 serving as a facsimile device communicates data with a device external of information-processing system 10, image-processing device 200 may conduct the communication via network 900, or may connect to a communication device other than network 900 and conduct the communication via the communication device.

Further, each image-processing device 200 has a function of transmitting its log to log management terminal 100. A log is data that records a process executed by image-processing device 200. A log includes information divided in multiple fields, where these items of information represent concrete content of a process. Also, each log includes information representing the date and time at which a process was executed. Thus, when multiple logs are recorded, these logs constitute data representing, chronologically, contents of processes. A detailed data configuration of a log in this exemplary embodiment will be described later.

User terminal 300 is a computer device used by a user. User terminal 300 may be a personal computer or a workstation, for example. User terminal 300 causes image-processing device 200 to execute a process in response to an instruction input by a user. Also, when required, user terminal 300 requests log management terminal 100 to output a report on the logs. It is to be noted here that a report on the logs may be a list of the logs stored in log management terminal 100, the list being displayed in a predetermined display format. The display format of a report may be in accordance with a predetermined standard format or may be designated by a user.

Log management terminal 100 is a computer device that receives and stores logs sent from multiple image-processing devices 200. Log management terminal 100 may be a personal computer such as user terminal 300, or may be a server device. Log management terminal 100 has a function of consolidating logs, and outputting a report on the logs when required. It is to be noted here that "consolidation" means deleting unnecessary information (information having a low usefulness) from the logs to reduce a volume of the logs as a whole.

The foregoing is a description of the overall configuration of information-processing system 10. In the following explanation, more detailed configuration of log management terminal 100, image-processing device 200, and user terminal 300 will be described.

Figure 2:
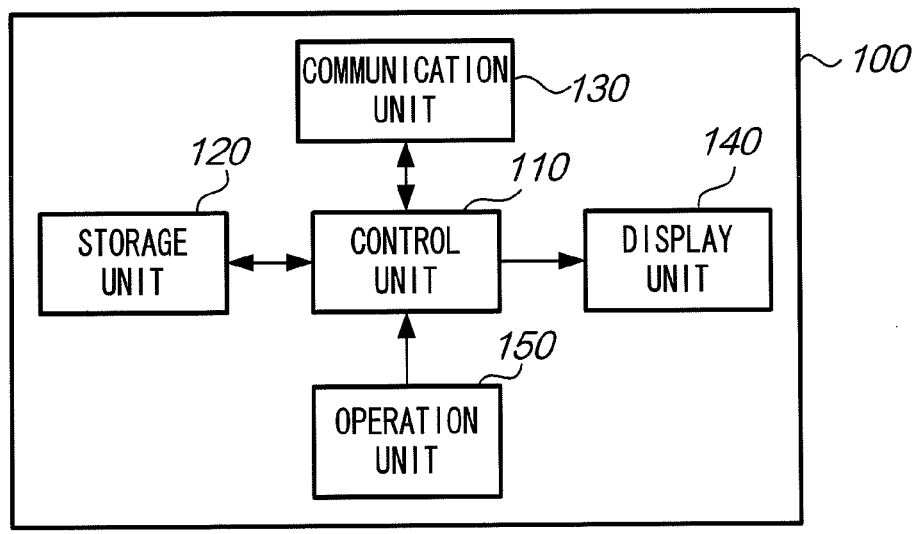
FIG. 2 is a block diagram showing a hardware configuration of a log management terminal.

FIG. 2 is a block diagram showing a hardware configuration of log management terminal 100. As shown in FIG. 2, log management terminal 100 includes control unit 110, storage unit 120, communication unit 130, display unit 140, and operation unit 150. Control unit 110 serves to control an operation of each unit of log management terminal 100. Control unit 110 includes a processing unit such as a CPU (Central Processing Unit) or the like and a storage device serving as a main memory, and executes programs to conduct control. Storage unit 120 serves to store data used by control unit 110. Storage unit 120 includes a storage device, such as a hard disk or the like, serving as an auxiliary storage device, and stores, for example, programs executed by control unit 110 and a log file(s), each of which is a file describing one or multiple logs. Communication unit 130 serves to conduct communication with image-processing devices 200 and user terminals 300. Concretely, communication unit 130 includes an interface for connecting with network 900 and transmitting and receiving data via network 900.

Display unit 140 is a liquid crystal display, for example, and serves to display information. Operation unit 150 serves to receive user operations. For example, operation unit 150 includes a mouse and a keyboard, and provides control unit 110 with data according to operations carried out by a user (hereinafter referred to as "operation information"). Operation unit 150 may be embodied as a touch screen disposed over display unit 140.

It is to be noted that, in a case where an operation by a user is not required, log management terminal 100 does not have to include display unit 140 or operation unit 150.

Figure 3:
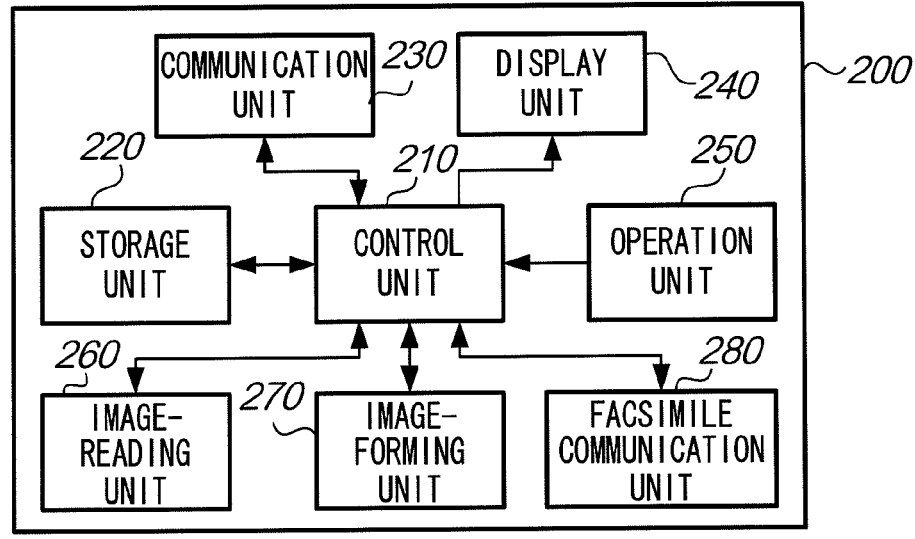
FIG. 3 is a block diagram showing a hardware configuration of an image-processing device.

FIG. 3 is a block diagram showing a hardware configuration of image-processing device 200. Image-processing device 200 shown in FIG. 3 is an example of image-processing device 200 having all of the functions of an image-forming device, an image-reading device, and a facsimile device. As shown in FIG. 3, image-processing device 200 includes control unit 210, storage unit 220, communication unit 230, display unit 240, operation unit 250, image-reading unit 260, image-forming unit 270, and facsimile communication unit 280.

Control unit 210 serves to control an operation of each unit of image-processing device 200. Control unit 210 includes a processing unit and a storage device serving as a main memory, and executes programs to conduct control. Storage unit 220 serves to store data used by control unit 210. Storage unit 220 stores, for example, programs executed by control unit 210 and a log file of image-processing device 200. Communication unit 230 serves to conduct communication with log management terminal 100 and user terminals 300.

It is to be noted that storage unit 220 may include a detachable storage device, such as a so-called USB (Universal Serial Bus) memory, and a device for writing and reading data to and from the storage device, so that data communication with another device can be achieved by exchange of the storage device by a user, not via network 900. In such a configuration, log management terminal 100 does not have to use network 900 to collect logs. Thus, in a case where logs are collected in this way, image-processing device 200 does not have to include communication unit 230.

Display unit 240 is a liquid crystal display, for example, and serves to display information. Operation unit 250 serves to receive user operations. For example, operation unit 250 includes buttons and switches, and provides control unit 210 with data according to operations carried out by a user (hereinafter referred to as "operation information"). Operation unit 250 may be embodied as a touch screen disposed over display unit 240.

It is to be noted that display unit 240 and operation unit 250 are used when a user operates image-processing device 200 directly. Thus, in a case where a user does not operate image-processing device 200 directly, and operates the same only from user terminal 300 via network 900, image-processing device 200 does not have to include display unit 240 and operation unit 250.

Image-reading unit 260, image-forming unit 270, and facsimile communication unit 280 each function to execute a process relating to an image, and correspond to an example of a processing unit relating to the present invention. Image-reading unit 260 serves to execute a process of reading a document optically to generate image data. Image-forming unit 270 serves to execute a process of forming an image on a recording medium, such as a sheet of paper or the like, in accordance with image data. Facsimile communication unit 280 serves to execute a process of transmitting image data to a facsimile device on the other end of the facsimile communication, or provides image-forming unit 270 with image data sent from the facsimile device on the other end of the facsimile communication. The communication conducted by facsimile communication unit 280 may be carried out via network 900, or may be carried out via a network other than network 900, such as a telephone network (not shown in the drawings), to which facsimile communication unit 280 is connected directly.

It is to be noted that image-processing device 200 does not have to include all of image-reading unit 260, image-forming unit 270, and facsimile communication unit 280. For example, image-processing device 200 may include only image-reading unit 260 and image-forming unit 270, but not a facsimile communication function; or may include only image-forming unit 270 and facsimile communication unit 280, but not a scanning function. Also, image-processing device 200 may be a model that supports only monochromatic images or a model that supports both of monochromatic images and color images.

FIG. 4 is a block diagram showing a hardware configuration of user terminal 300. As shown in FIG. 4, user terminal 300 includes control unit 310, storage unit 320, communication unit 330, display unit 340, and operation unit 350. Each of these units has a hardware configuration similar to that of a corresponding unit of log management terminal 100 referred to by the same term. That is, the difference in reference signs assigned to these units are only for distinguishing the units included in log management terminal 100 from those included in user terminal 300. It is to be noted, however, that log management terminal 100 and user terminal 300 can be different from each other in terms of concrete features such as executed processes and processing capabilities, or stored data and storage capacities.

In the above-described configuration, a user operates user terminal 300 or operates directly one of image-processing devices 200, so that the one of image-processing devices 200 executes a process (a process relating to an image). Image-processing device 200 executes the process to provide the user with predetermined one or multiple services. In this exemplary embodiment, there are four services that can be provided by image-processing device 200: "scan (service)"; "print (service)"; "copy (service)"; and "facsimile (service)."

A scan service is a service of recording image data generated as a result of reading of a document by image-reading unit 260 into storage unit 220 or storage unit 320. A print service is a service of forming of an image by image-forming unit 270 according to image data sent from user terminal 300. A copy service is a service of forming of an image by image-forming unit 270 according to image data generated by image-reading unit 260. A facsimile service is a service of transmitting image data to a facsimile device on the other end of the facsimile communication, or forming an image according to image data received from the facsimile device on the other end of the facsimile communication. It is to be noted that in the facsimile service, instead of an image being formed by image-forming unit 270, an image may be visually displayed by display unit 340.

After executing a process relating to any of these services, image-processing device 200 records the process as a log. Image-processing device 200 may store a log file temporarily, but eventually sends it to log management terminal 100 at an appropriate timing Image-processing device 200 sends a log file to log management terminal 100 at a timing when a predetermined number of services have been executed, or at a predetermined time interval (e.g., at a fixed daily time). It is also possible for image-processing device 200 to send a log file each time it executes any service. Also, log management terminal 100 may instruct at an appropriate timing (e.g., regularly, such as hourly) that image-processing device 200 should send a log file, whereby image-processing device 200 sends a log file to log management terminal 100 in response to the instruction.

Log management terminal 100 collects logs from multiple image-processing devices 200 and manages the collected logs. It is to be noted here that management of logs means recording the logs and consolidating them, as necessary. Further, log management terminal 100 outputs a report on the logs at a predetermined timing or at a timing in response to a request from a user.

FIG. 5 is a diagram showing an example of a data format of a log. As shown in FIG. 5, a log in this exemplary embodiment is data including items of information in eight fields, that is, "user name," "device name," "model name," "service name," "color mode," "sheet size," "number of sides," and "number of sheets." It is to be noted that the fields in a log are not limited to those exemplarily shown here.

The user name is a field where information representing a user who instructed execution of a process is stated. The device name is a field where information representing image-processing device 200 that executed a process is stated. The information corresponding to the user name or the device name may be an appropriate string of characters assigned to each user or each device. The model name is a field where information representing a model of image-processing device 200 that executed a process is stated. The difference between the device name and the model name is that the device name is information unique to each image-processing device 200 while the model name is common to image-processing devices 200 of the same model.

The service name is a field in which information is stated representing which of the four services was executed by image-processing device 200. The color mode is a field in which information is stated representing which of the monochromatic mode or the color mode the service executed by image-processing device 200 was in. The sheet size is a field in which information is stated representing a size of a sheet on which an image was formed (or a size of a document). The number of sides is a field in which information is stated representing whether image-processing device 200 executed a process on only one side or on both sides of a sheet of paper (or a document). For example, if image-processing device 200 formed an image on a single side of a sheet of paper, the number of sides is "1," while if an image was formed on each side of a sheet of paper, the number of sides is "2." The number of sheets is a field in which information is stated representing a number of sheets (or documents) on which image-processing device 200 executed a process.

In this exemplary embodiment, information in fields "user name," "device name," "model name," "service name," "color mode," and "sheet size" is an example of information that is a candidate for deletion. On the other hand, information in fields "number of sides" and "number of sheets" is an example of a count value relating to a process executed by image-processing device 200, and is excluded as a candidate for deletion.

Figure 6:
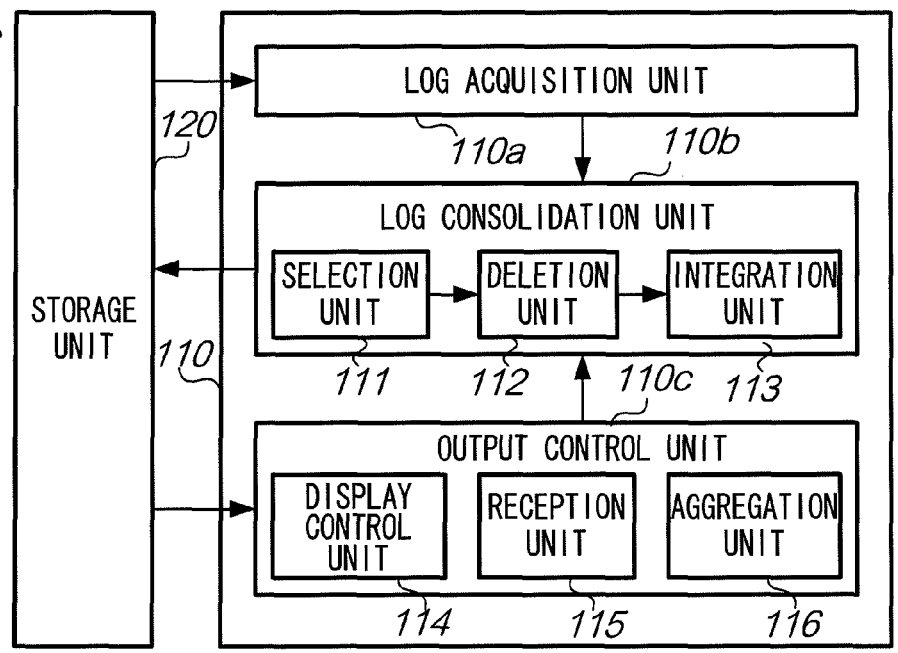
FIG. 6 is a functional block diagram showing a functional configuration of a log management terminal.

FIG. 6 is a functional block diagram showing a functional configuration of log management terminal 100. The functional configuration of control unit 110 of log management terminal 100 is roughly divided into log acquisition unit 110a, log consolidation unit 110b, and output control unit 110c, as shown in FIG. 6. Control unit 110 of log management terminal 100 executes a program to realize the functions corresponding to the units shown in FIG. 6. The functional configuration (or a part thereof) of control unit 110 corresponds to an example of a log consolidation device relating to the present invention. It is to be noted that the functions corresponding to log acquisition unit 110a, log consolidation unit 110b, and output control unit 110c may be realized separately by respective programs.

Log acquisition unit 110a has a function of acquiring a log file. Log acquisition unit 110a stores a log file sent from image-processing device 200 into storage unit 120, and when necessary, reads out the log file from storage unit 120 to provide the log file to log consolidation unit 110b. It is to be noted that log acquisition unit 110a may have a function of requesting image-processing device 200 to send a log file.

Log consolidation unit 110b has a function of consolidating logs using the log file acquired by log acquisition unit 110a. The timing at which log consolidation unit 110b performs consolidation of logs is, for example, when an overall volume or a number of logs of a log file has reached a predetermined threshold value, or when a user instructs log consolidation. Log consolidation unit 110b is divided into selection unit 111, deletion unit 112, and integration unit 113.

Selection unit 111 selects a part of fields of logs represented by a log file. The field(s) selected by selection unit 111 may be determined in accordance with a result of aggregation carried out by aggregation unit 116, which will be described later, or may be determined by an operation performed by a user of log management terminal 100 (hereinafter referred to as "administrator"). It is also possible that each time a predetermined period has lapsed, a specific field(s) is selected. Deletion unit 112 deletes items of information in the field(s) selected by selection unit 111. Deletion unit 112 serves to reduce a volume of a log file as a whole by decreasing the number of fields in a log. Integration unit 113 performs a process of integrating logs that can be integrated, among the logs for which deletion of fields by deletion unit 112 has been performed. It is to be noted that "integration" here means integrating multiple logs into a single data block. Also, "logs that can be integrated" are logs having common information at least in some of the fields (as will be described in detail later).

In addition to the above-described mode of deleting a specific field(s) of a log, deletion unit 112 may perform deletion of data in a mode of deleting an entire log. A process in step Sa3, which will be described later, is an example of a mode of deleting an entire log.

Also, though the deletion performed by deletion unit 112 may be deletion of a field(s) of a log, it may also be carried out by converting the information in a field to be deleted to blank (null) or to a prescribed value (a value having a smaller data amount than that of the original information), such as "0."

Output control unit 110c has a function of controlling output of a report based on a log file stored in storage unit 120. In this exemplary embodiment, output control unit 110c transmits to user terminal 300 data for causing a report on the logs to be displayed on display unit 340 of user terminal 300 (this data will be referred to as "report data" hereinafter). The transmission of report data to user terminal 300 is an example of a mode of output of a report. Output control unit 110c is divided into display control unit 114, reception unit 115, and aggregation unit 116.

Display control unit 114 conducts control for causing a screen necessary for outputting a report to be displayed on display unit 340 of user terminal 300. The screen displayed on display unit 340 under the control of display control unit 114 includes at least a screen for allowing a user to designate a display format of a report (hereinafter referred to as "designation screen"). Reception unit 115 receives a designation input by a user by acquiring, via communication unit 130, operation information transmitted from user terminal 300. At this time, the user designates fields to be displayed (or not to be displayed) in the report via the designation screen. Aggregation unit 116 aggregates, for each field of a log, a number of times that the field was designated. The result of aggregation by aggregation unit 116 is provided to log consolidation unit 110b, and is used for log consolidation.

Figure 7:
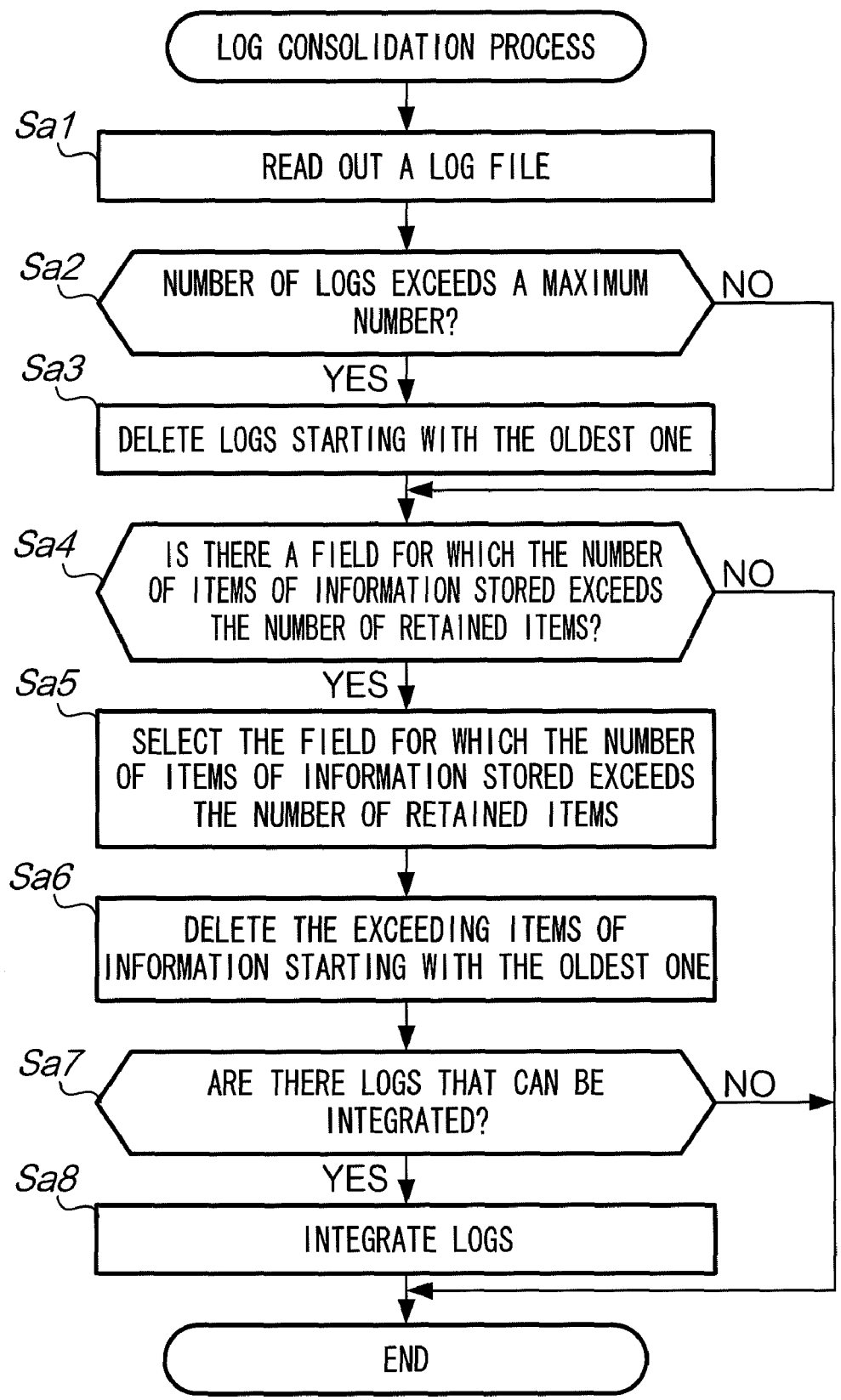
FIG. 7 is a flowchart showing a log consolidation process.

FIG. 7 is a flowchart showing a process of consolidating a log file (hereinafter referred to as "log consolidation process"). Further, FIG. 8 is a diagram showing an example of data used in the log consolidation process. FIG. 8 exemplarily shows "number of designated times" and "number of retained items" for each field of a log. The number of designated times is data indicating a number of times that a field was designated as a field to be included in a displayed report, and the number of retained items is a number of items (or a number of logs) determined necessary to retain a field without deleting it. These data are stored in storage unit 120, for example.

In this example, the number of designated times is expressed by "$x_1$," "$x_2$," ... "$x_6$" for the six fields that can be designated by a user. With regard to the fields "number of sides" and "number of sheets," it is assumed that they are always displayed in a report without need for designation by a user. Thus, there is no data representing the number of designated times for these two fields.

Further, the number of retained items is expressed by "$N_1$," "$N_2$," ... "$N_6$" for the six fields that can be designated by a user, and by "$N_{max}$" for each of the other two fields. $N_1$-$N_6$ are values respectively obtained as functions of $x_1$-$x_6$ ($f_1(x_1)$–$f_6(x_6)$). These functions may or may not be identical with one another. It is to be noted, however, that each function is defined such that the number of retained items tends to increase as the number of designated times increases. It is also to be noted that $N_{max}$ may be a predetermined fixed value or may be the maximum one of $N_1$-$N_6$.

Explanation will be given below of a log consolidation process using the above-described data. Control unit 110 of log management terminal 100 reads out and acquires a log file stored in storage unit 120 at an appropriate timing (step Sa1), and determines whether a number of logs stored in storage unit 120 exceeds a maximum number (step Sa2). The maximum number here is the above-described $N_{max}$, for example. If the number of stored logs is greater than the maximum number, control unit 110 deletes logs in order, starting with the oldest, so that the total number becomes equal to or smaller than the maximum number (step Sa3). On the other hand, if the number of stored logs is equal to or smaller than the maximum number, control unit 110 skips (omits) the process in step Sa3. It is to be noted that the process in step Sa3 is not to delete information in a part of the fields of data of a log, but to delete an entire block of data of a log (i.e., entire fields and count values).

Next, control unit 110 reads out the number of retained items for each field of the read-out log file, and determines whether there is a field for which the number of items of information stored exceeds the number of retained items (step Sa4). If there is such a field, control unit 110 selects the field (step Sa5), and deletes the items of information in order, starting with the oldest, so that the number of items of information in the field becomes equal to or smaller than the number of retained items (step Sa6). It is to be noted that in a case where there are multiple fields for each of which the number of items of information stored exceeds the associated number of retained items, control unit 110 performs the selection and deletion with respect to each of the multiple fields. If the number of items of information in any field does not exceed the related number of retained items, control unit 110 terminates the log consolidation process.

Subsequently, control unit 110 refers to the log file on which deletion of a field(s) has been performed, and determines whether there are logs that can be integrated (step Sa7). If there are logs that can be integrated, control unit 110 integrates these logs (step Sa8). On the other hand, if there are no logs that can be integrated, control unit 110 skips the process in step Sa8 and terminates the log consolidation process. It is to be noted that logs that can be integrated are those in which information in each field other than the count values is identical with corresponding information of another log.

FIGS. 9A to 9C and FIGS. 10A and 10D are a set of diagrams showing an example of a change in a log file derived by a log consolidation process. It is to be noted that, for convenience of explanation, these drawings only show logs for which deletion of a field(s) is to be performed, and logs for which deletion of a field(s) is not to be performed (i.e., relatively new logs whose number does not exceed the number of retained items) are not shown. With regard to the relatively new logs whose number does not exceed the number of retained items, log management terminal 100 retains items of information in the field to be deleted. In this case, a resulting log file will contain logs having a different number of fields, and generally, an older log tends to have a smaller number of fields.

FIG. 9A shows an initial state of four logs. FIG. 9B shows a state in which items of information in the field "color mode" have been deleted in the initial state. In the state shown in FIG. 9B, the log on the first row and the log on the third row have a common item of information in each of the fields "user name," "device name," "model name," "service name," and "sheet size." Thus, log management terminal 100 integrates these logs into a single log.

FIG. 9C shows logs after the integration, and in FIG. 9C, the number of logs has been reduced to three from four. In this example, the log on the first row is a log obtained by integration of the log on the first row and the log on the third row in FIG. 9B. In this log, an item of information in each of the fields "user name," "device name," "model name," "service name," and "sheet size" is the same as that before the integration, and an item of information in each of the fields "number of sides" and "number of sheets" is derived as a value obtained by summing up the items of information before the integration. Thus, integration in this exemplary embodiment combines multiple logs having a common item of information in each field (more specifically, having a common item of information in each of the fields that have not been deleted yet) into a single log by summing up the count values. It is to be noted here that summing up refers to computation based on multiple values to combine the multiple values into a single value, and is typically addition, but may be another computation.

An example shown in FIG. 10A shows a state in which items of information in the field "sheet size" have been deleted from the state shown in FIG. 9C. After such deletion has been performed, log management terminal 100 integrates the log on the first row and the log on the second row that have a common item of information in each of the fields "user name," "device name," "model name," and "service name." The logs after the integration are shown in FIG. 10B. Then, upon further deletion of items of information in the field "user name" in the state shown in FIG. 10B, the logs shown in FIG. 10C are obtained, and integration of these logs results in the state shown in FIG. 10D.

Log management terminal 100 executes the above-described log consolidation process repeatedly, thereby to reduce a volume of a log file stored in storage unit 120. In a log file of this exemplary embodiment, information in a field with a smaller number of designated times is deleted earlier. As a result, information in a field with a relatively large number of designated times (i.e., information used by a user with relatively high frequency) tends to be retained for a long period without being deleted. That is, in a log file of this exemplary embodiment, information used by a user more frequently tends to be retained for a longer period.

In a case where an image is formed on each side of a sheet of paper, and the printing is performed in a color mode on one side and in a monochromatic mode on the other, for example, image-processing device 200 may generate a single log by interpreting that the printing has been performed in only one of the two modes or may generate two logs corresponding to respective modes. It is to be noted, however, that in a case where two logs are generated, it is desirable to state "0.5" as the information indicating the sheet number in each log, or to state "1" as the information in one log and "0" as the information in the other log, so that the information indicating the sheet number after integration of the logs will not be contradictory.

FIG. 11 is a flowchart showing a process executed when log management terminal 100 outputs a report (hereinafter referred to as "report output process"). A report output process is executed when a user requests output of a report. In the following, explanation will be given of an example in which a user operates user terminal 300 to request output of a report. It is to be noted that in a case where a user (or an administrator) directly operates log management terminal 100 to request output of a report, "display unit 340 (of user terminal 300)" should be replaced with "display unit 140" and "operation unit 350 (of user terminal 300)" should be replaced with "operation unit 150."

As shown in FIG. 11, first, control unit 110 of log management terminal 100 gives an instruction to user terminal 300 via communication unit 130 to cause display unit 340 to display the above-described designation screen (step Sb1). After causing display unit 340 to display the designation screen in response to the instruction, user terminal 300 goes into a state in which user terminal 300 can receive designation of display format of a report by a user. Upon receipt of an operation performed by a user, user terminal 300 transmits operation information to log management terminal 100. Control unit 110 of log management terminal 100 acquires the operation information via communication unit 130, thereby to receive designation of a display format of a report by a user (step Sb2). Thereafter, control unit 110 outputs report data in a display format in accordance with the designation, and transmits the data to user terminal 300 via communication unit 130 (step Sb3).

Figure 12:
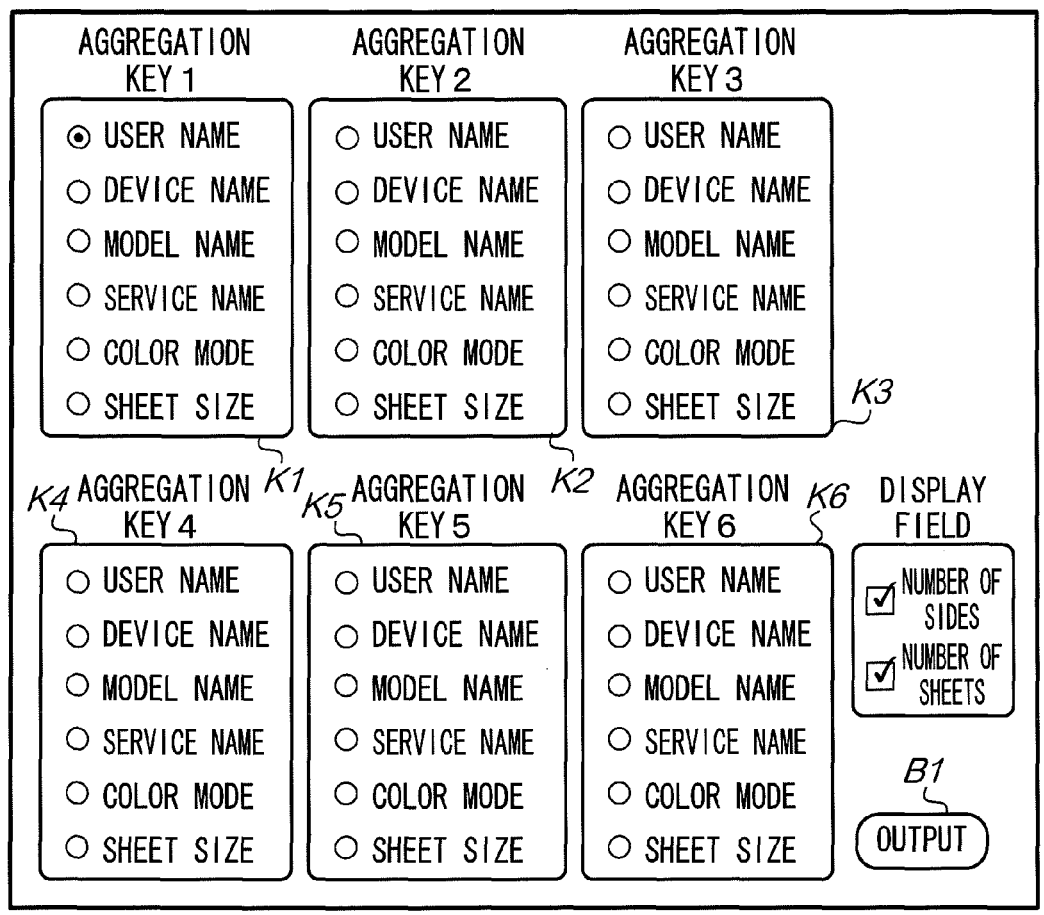
FIG. 12 is a diagram showing an example of a designation screen.

FIG. 12 is a diagram showing an example of a designation screen. A designation screen provides a user interface for allowing a user to designate fields to be displayed in a report. The designation screen shown in FIG. 12 includes radio buttons for designating multiple aggregation keys K1-K6, check boxes for designating count values (number of sides, number of sheets) to be displayed, and output button B1 for transmitting operation information to output a report. The aggregation keys correspond to the fields to be displayed in a report. It is possible that only a single aggregation key is designated, though multiple aggregation keys may be designated.

For example, in a case where "user name" is designated as an aggregation key, a report containing at least "user name" as a display field is output. Also, in this report, the count values designated by a user are included as display fields. It is to be noted that reports may be displayed after being sorted (or rearranged) according to designated aggregation keys, or may be displayed in a time-sequential order.

The number of retained items for each field may be set to "0" depending on the number of designated times of the field. In such a case, the items of information in the field are all deleted without being recorded in a log file in storage unit 120. If there is such a field, log management terminal 100 causes display unit 340 to display a designation screen that is adapted so as not to allow a user to designate a display format including the field in question as a display field. Concretely, log management terminal 100 causes display unit 340 to display a designation screen adapted such that a field that is not contained in any log and thus is not able to be displayed cannot be designated as an aggregation key. Such a designation screen may be a screen in which a radio button corresponding to a field that cannot be displayed is deleted, for example.

Also, with regard to a field designated as an aggregation key, the number of designated times is stored in log management terminal 100. If multiple files are designated as aggregation keys, log management terminal 100 may add "1" to the number of designated times of each of the designated fields, or may add a value weighted according to an order in which the fields are designated as aggregation keys. For example, weighting may be performed such that "1" is added to the number of designated times of a field designated in aggregation key K1, "0.9" is added to the number of designated times of a field designated in aggregation key K2, "0.8" is added to the number of designated times of a field designated in aggregation key K3, and so on.

It is to be noted that a number of logs displayed in a report may be a predetermined number or may be the total number of logs recorded in a log file. Also, in a case where N number of items of information are stored in storage unit 120 for one display field while only M (N>M) number of items of information are stored for another display field, for example, it is desirable that a report be adapted such that the number of logs displayed therein corresponds to the smaller one of the numbers of items of information (in this example, M), though it is also possible that the number of items displayed is different from one display field to another.

[Second Exemplary Embodiment]

In this exemplary embodiment, a data format of a log is changed from that of the first exemplary embodiment. That is, this exemplary embodiment is different from the first exemplary embodiment with regard to the data format of a log and data processing performed in accordance with the data format, but is the same as the first exemplary embodiment with regard to the other points (such as a hardware configuration, etc.). Therefore, in the following explanation, the same reference numbers as those used in the first exemplary embodiment are used to denote the parts in common with the first exemplary embodiment.

FIG. 13 is a functional block diagram showing a functional configuration of log management terminal 100 in this exemplary embodiment. In this exemplary embodiment, the functional configuration of control unit 110 is different from that of the first exemplary embodiment (FIG. 6) in that log consolidation unit 110b includes date and time information conversion unit 117 in this exemplary embodiment. Date and time conversion unit 117 has a function of converting, among items of date and time information (i.e., items of information indicating a date and time by use of numerical values), those having a common element(s) to one representative value. Date and time information conversion unit 117 corresponds to an example of a conversion unit relating to the present invention.

Figure 14:
FIG. 14 is a diagram showing an example of a data format of a log.

FIG. 14 is a diagram showing an example of data format of a log in this exemplary embodiment. In a log of this exemplary embodiment, a field "processing date and time" is added to a log of the first exemplary embodiment. It is to be noted that though some of the fields are not shown in FIG. 14, a log of this exemplary embodiment includes all of the fields that are included in a log of the first exemplary embodiment. The processing date and time is a field in which date and time information indicating a date and time at which a process was executed in image-processing device 200 is stated. An item of date and time information may be expressed in units of date (year, month, and date) and time (hour, minute, and second), and in this exemplary embodiment, is expressed in a format in which the units of "year, month, and date" and "hour, minute, and second" are separated from one another by a period. For example, an item of date and time information indicating "2010-10-01 12:34:56" is "2010.10.01.12.34.56." It is to be noted that the processing date and time may indicate either of a starting time or an ending time of a process.

In a case where a log file is described in accordance with the above-explained data format, log management terminal 100 executes a process of converting multiple values, each indicating a processing date and time, to a single representative value. The representative value herein is a value obtained by rounding up or down a numerical value of a relatively small unit of time, among numerical values constituting an item of date and time information. For example, a representative value of an item of information (2010.10.01.12.34.56) indicating a processing date and time "2010-10-1 12:34:56" may be "2010.10.01.12.34.00 (2010-10-1 12:34)." This representative value indicates that the time at which a process was executed by image-processing device 200 is "2010-10-1 12:34" or between "2010-10-1 12:34" and "2010-10-1 12:35." In the following description, the conversion of an item of information indicating a processing date and time to a representative value may be referred to as "generalization." Briefly, generalization herein is rounding of a numerical value of an item of date and time information. It is to be noted that generalization may be performed based on a unit other than the units used in an item of information indicating a processing date and time, such as "quarter of a year" or "morning/afternoon."

Generalization of an item of date and time information may be performed multiple times on the same log. For example, if the above-described value "2010.10.01.12.34.00 (2010-10-1 12:34)" is further generalized, a value "2010.10.01.12.00.00 (2010-10-1 12 o'clock)" is obtained. If similar generalization is reiterated on this value, the value is converted to "2010.10.01.00.00.00 (2010-10-1)," and then, to "2010.10.00.00.00.00 (2010-10)." Thus, as a generalization progresses, a number of logs having a common item of date and time information increases, as compared to a case where generalization is not performed, and this leads to a higher possibility that a greater number of logs can be integrated. It is preferred that generalization of an item of date and time information is performed in stages, whereby, for example, when a week has passed since recordation of a log, information of "second" is generalized, when a month has passed since recordation of the log, information of "minute" is generalized, when half a year has passed since recordation of the log, information of "hour" is generalized, and so on. In such a case, a an item of date and time information of a log having an older recording date and time in a log file tends to have progressed further.

Generalization of an item of date and time information may be performed independently from the above-described log consolidation process or may be performed as a part of a log consolidation process. In a case where generalization of an item of date and time information is performed as a part of a log consolidation process, it may preferably be performed at a timing immediately before the process of step Sa4 (see FIG. 7) is performed, but may be performed at another timing.

In a log consolidation process carried out in a case where a processing date and time is recorded for each log, it is possible to use a period during which logs are recorded (hereinafter referred to as "retainment period"), instead of a number of logs (i.e., a number of retained items), as a criterion for determining whether to retain or delete an item of information in each field. In a case where a retainment period is used, "number of retained items" in the above-described log consolidation process (see FIG. 7) should be replaced with "retainment period."

Figure 15:
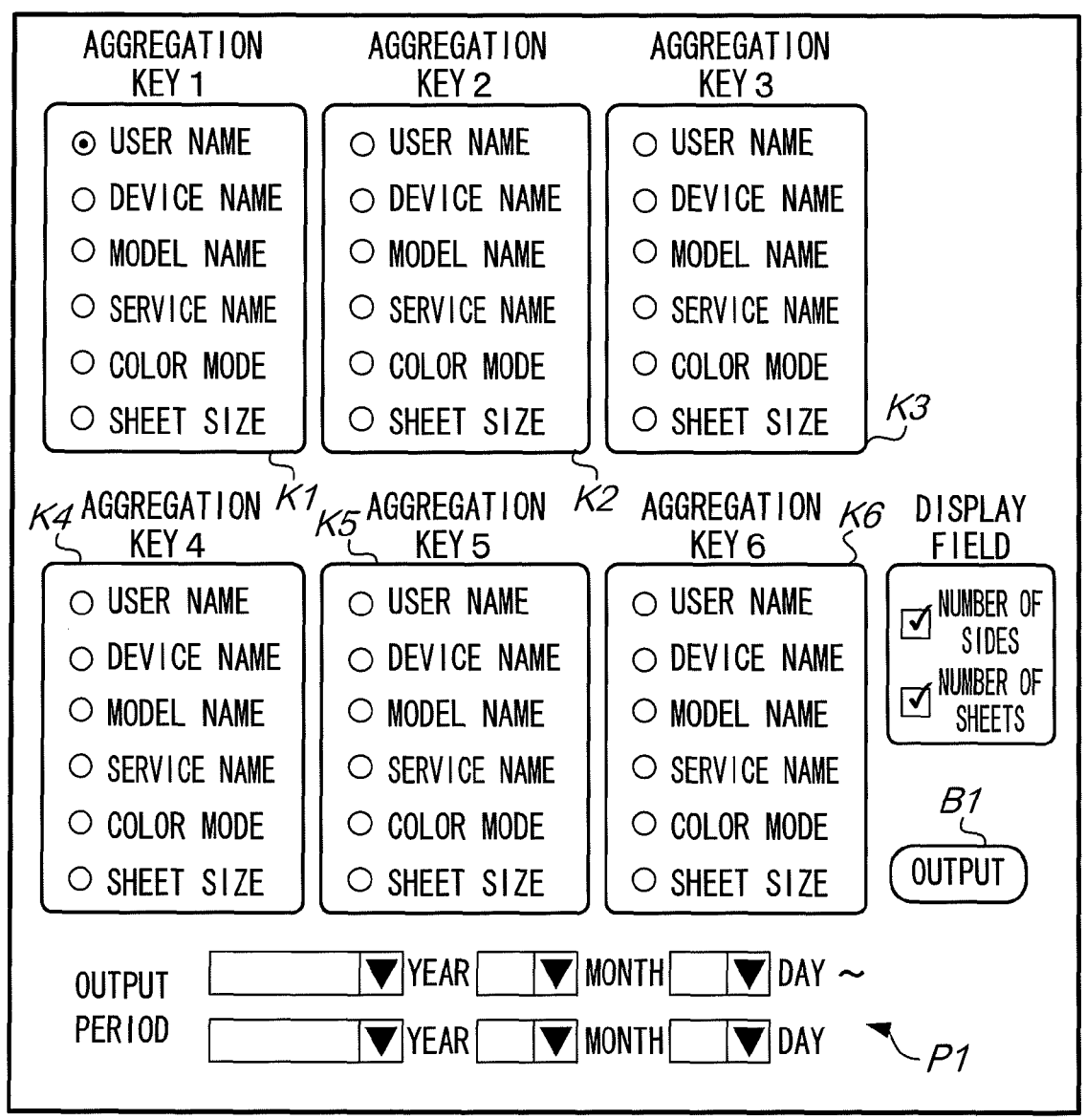
FIG. 15 is a diagram showing an example of a designation screen.

FIG. 15 is a diagram showing an example of a designation screen in this exemplary embodiment. The designation screen of this exemplary embodiment is different from the designation screen of the first exemplary embodiment (see FIG. 12) in that the designation screen of this exemplary embodiment includes pull-down menu group P1 for designating a period of logs to be output in a report. Pull-down menu group P1 is configured such that numerical values that can be designated differ depending on the logs stored in storage unit 120. That is, pull-down menu group P1 is configured such that a user cannot designate an output period during which no logs are stored in storage unit 120.

It is to be noted that a retainment period of each field may vary from one field to another. Thus, the limitation on the output period may change depending on an aggregation key designated by a user. For example, an output period in a case where "user name" is designated in aggregation key K1 is limited to within a retainment period of information in "user name." In this case, if another field, for example, "device name," is designated in aggregation key K2, and a retainment period of information in "device name" is shorter than that of "user name," the output period that can be designated in the designation screen is caused to change to the retainment period of information in "device name" (or to a period not exceeding the retainment period).

It is also possible not to limit the output period, and to perform aggregation using "indefinite" with regard to a part of a designated output period that goes beyond the retainment period. For example, in a case where "user name" is designated in aggregation key K1, it is possible that items of information within the retainment period of "user name" are aggregated for each user name (such as "Suzuki," "Sato," or the like), while items of information outside the retainment period are aggregated as items of information whose "user name" is "indefinite."

[Modifications]

A mode of carrying out the present invention is not limited to the above-described exemplary embodiments, and the following modifications are possible, for example. The above-described embodiments and the following modifications may be used in any combination, as necessary.

(Modification 1)

A function of a log consolidation device relating to the present invention may be realized by image-processing device 200. In a case where image-processing unit 200 has a function of a log consolidation device, log management terminal 100 may be unnecessary. Also, it is not necessary that multiple image-processing devices 200 and multiple user terminal 300 are provided. Further, in a case where image-processing device 200 performs display of a designation screen and reception of operations carried out by a user, user terminal 300 may also be unnecessary. In such a case, a display unit of the invention is realized by display unit 240. In a case where a single image-processing device 200 and a single user terminal 300 are used, for example, network 900 may be replaced with another wired or wireless communication device.

(Modification 2)

A mode of output of a report relating to the present invention is not limited to a mode in which report data is transmitted to user terminal 300 or a mode in which a report is displayed on log management terminal 100. For example, a report may be recorded on a sheet of paper by means of image-forming unit 270 of any image-processing device 200, or may be transmitted via facsimile communication unit 280 to an outside of image-processing system 10.

(Modification 3)

Fields of a log relating to the present invention are not limited to those shown in the above-described exemplary embodiment. For example, in a case where uses in image-processing system 10 are classified into multiple groups, a log may include a field "group name." Also, as another example of a count value, fees required for processing by image-processing device 200 may be considered.

(Modification 4)

A processing unit relating to the present invention is not limited to those that execute a process relating to an image, and various units that execute a process on some object or data may serve as a processing unit. Thus, it is also to be noted that a content of a log relating to the present invention is not limited to a record of processing relating to an image.

The present invention may be practiced as a log consolidation device, or may be practiced as a log management terminal or an image-processing device equipped with a log consolidation device. Also, the present invention may be practiced as an information-processing system including multiple log management terminals and image-processing devices, or as a log consolidation method executed in such a system. The present invention may be embodied as a program for causing a computer to function as a log consolidation device or as a storage medium on which the program is stored. A program according to the present invention may be acquired from an external device via a network or any other communication device, so as to be downloaded to the computer.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A log consolidation device comprising:
a selection unit that selects at least part of fields included in a plurality of logs stored in a storage unit and chronologically representing processes executed by one or a plurality of processing units, each log including information representing content of a process and a count value relating to the process, the information being divided into a plurality of fields;
a deletion unit that deletes, from at least part of the plurality of logs stored in the storage unit, items of information in the fields selected by the selection unit; and
an integration unit that integrates into a single log two or more of the plurality of logs having identical items of information in fields that were not deleted by the deletion unit by summing up the count values of the two or more of the plurality of logs.

2. The log consolidation device according to claim 1, further comprising an aggregation unit that aggregates a number of times that each of the plurality of fields is designated as a display field, wherein the selection unit selects a field(s) whose number of times aggregated by the aggregation unit is smaller than that of the other fields.

3. The log consolidation device according to claim 2, wherein the deletion unit determines, for each field, a period in which the items of information are retained without being deleted or a number of items of information that are retained without being deleted, based on the number of times aggregated by the aggregation unit with regard to the field.

4. The log consolidation device according to claim 1, wherein
each of the plurality of logs includes, in the information, an item of date and time information expressing a date and time at which a process was executed by the processing unit with a numerical value for each one of a plurality of units, and
the log consolidation device includes a conversion unit that converts two or more items of date and time information having different numerical values in part of the plurality of units to a common representative value.

5. The log consolidation device according to claim 1, further comprising:

a display control unit that causes a display unit to display a screen for allowing a user to designate a display format used when the logs stored in the storage unit are displayed; and a reception unit that receives a designation by the user according to the screen caused to be displayed on the display unit by the display control unit, wherein when the deletion unit deletes items of information, the display control unit changes the screen such that the user cannot designate a display format that has become unable to be displayed as a result of deletion of the items of information.

6. A log consolidation method comprising:

selecting at least part of fields included in a plurality of logs stored in a storage unit and chronologically representing processes executed by one or a plurality of processing units, each log including information representing content of a process and a count value relating to the process, the information being divided into a plurality of fields;

deleting, in at least part of the plurality of logs stored in the storage unit, items of information in the selected fields; and integrating into a single log two or more of the plurality of logs having identical items of information in fields that were not deleted by summing up the count values of the two or more of the plurality of logs.

7. A non-transitory computer-readable medium storing a program causing a computer to execute a method for log consolidation, the method comprising:

selecting at least part of fields included in a plurality of logs stored in a storage unit and chronologically representing processes executed by one or a plurality of processing units, each log including information representing content of a process and a count value relating to the process, the information being divided into a plurality of fields;

deleting, in at least part of the plurality of logs stored in the storage unit, items of information in the selected fields; and integrating into a single log two or more of the plurality of logs having identical items of information in fields that were not deleted by summing up the count values of the two or more of the plurality of logs.

* * * * *